C. ALEXANDER.
Candlestick.
No. 34,045.
Patented Jan. 7, 1862.
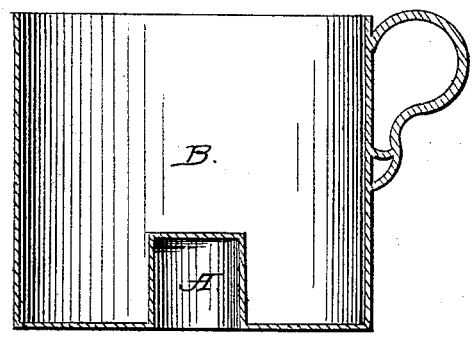
Witnesses.
C. M. Alexander,
A. Yeatman
Inventor.
Charles Alexander,

UNITED STATES PATENT OFFICE.

CHARLES ALEXANDER, OF WASHINGTON, DISTRICT OF COLUMBIA.

IMPROVED CAMP-CANDLESTICK.

Specification forming part of Letters Patent No. 34,045, dated January 7, 1862.

*To all whom it may concern:*

Be it known that I, CHARLES ALEXANDER, of the city of Washington and District of Columbia, have made certain new and useful Improvements in Camp-Candlesticks; and I do hereby declare that the following is a true and exact description of the same, reference being had to the accompanying drawings, and to the letters of reference marked thereon.

The object of my invention is to furnish a utensil adapted to the wants of the soldier in camp-life, its chief recommendation to consist in facility of transportation. This desideratum is successfully obtained when an article of indispensable use is made to perform two or more offices in place of one without increasing the labor of transportation. I claim to have accomplished this in my invention.

The letter A represents the socket intended to receive the candle. This socket is made about an inch in length and is inserted into the bottom of the cup just at the center and is made flush with the bottom of the cup, so that when it is used it is without any inequality of surface and sits firmly on a table, chair, or on the ground. The end of the socket inside the cup is securely soldered to prevent the escape of liquor when the cup is applied to its appropriate use. When used as a candlestick the cup is inverted and the candle inserted and the utensil applied to its secondary but equally important use.

What I claim, and for which I wish to procure Letters Patent, is—

The within-described combined cup and candlestick as an article of manufacture, the same being constructed substantially as and for the purpose herein set forth.

CHARLES ALEXANDER.

Witnesses:
C. M. ALEXANDER,
A. YEATMAN.